UNITED STATES PATENT OFFICE.

BALFOUR FRASER McTEAR, OF LEA GREEN, VIA RAINHILL, ENGLAND.

MANUFACTURE OF SALT.

933,572.  Specification of Letters Patent.  Patented Sept. 7, 1909.

Application filed November 4, 1907. Serial No. 400,598.

*To all whom it may concern:*

Be it known that I, BALFOUR FRASER MCTEAR, a subject of the King of Great Britain and Ireland, residing at St. Michael's House, Lea Green, via Rainhill, in the county of Lancaster, England, have invented certain new and useful Improvements in the Manufacture of Salt, of which the following is a specification.

This invention relates to the manufacture of white or pure salt from the ordinary impure or rock salt in its natural condition.

Heretofore white salt has been manufactured from rock salt by melting the latter in an ordinary open hearth furnace and running the molten material therefrom into receptacles or converters, and after treatment in such converters allowing it to remain in a molten state, quiescent for a time, so that the impurities may settle out.

The object of my present invention is to produce white or pure salt from ordinary impure or rock salt in a cheaper and more efficient and reliable manner than heretofore.

The invention comprises the process and means as hereinafter described for purifying the molten salt.

Figure 1:
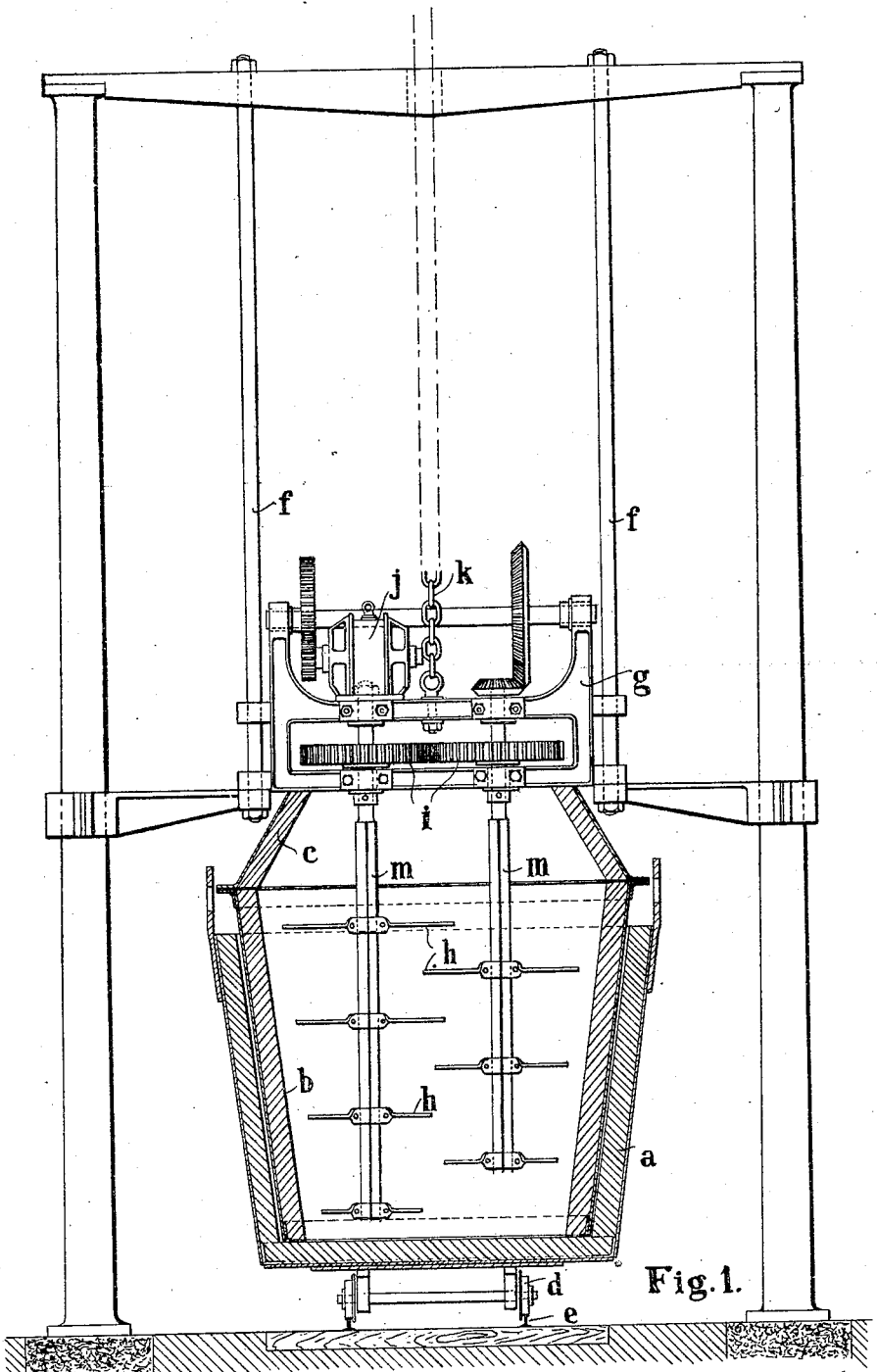
Figure 2:
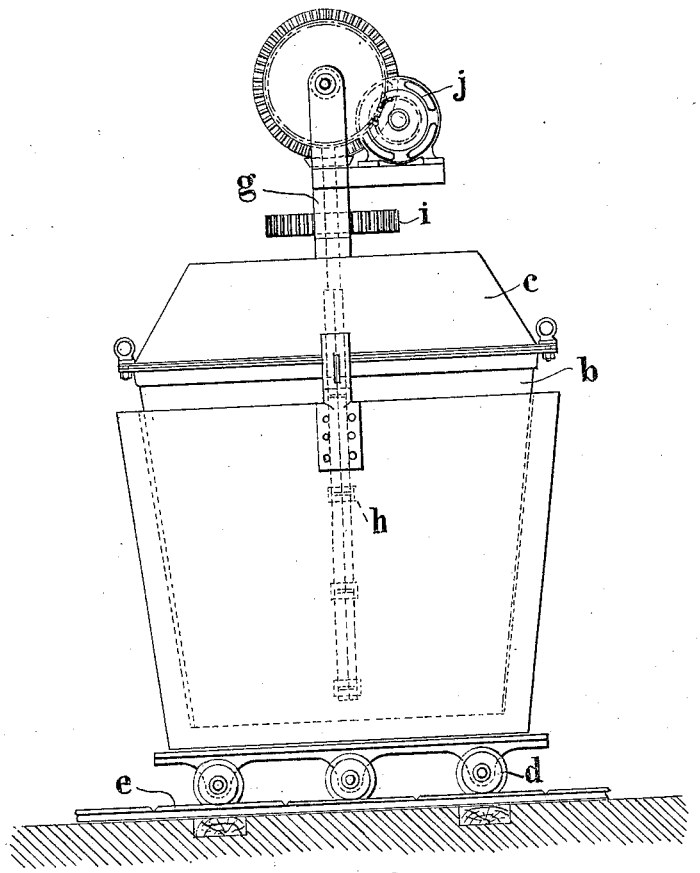

Referring to the accompanying sheet of explanatory drawings:—Figure 1 shows in sectional elevation and Fig. 2 in side elevation, with certain parts omitted for the sake of clearness, one convenient form of apparatus which I employ in carrying my invention into effect.

The same reference letters in the two views indicate the same parts.

The rock salt to be treated is first melted in an open hearth or other furnace and is then drawn off into suitable receptacles or converters. One of such converters is illustrated in the accompanying drawings. It consists of an outer casing as $a$, lined with firebrick and provided with a detachable bottomless liner $b$ having a hood $c$ at its upper end. The converters $a$ are mounted on wheels $d$ and arranged to run on a track $e$. Before they are filled with the molten material from the melting furnace, the converters are suitably heated by flame and hot gases. After the converters $a$ are filled with molten salt, I pass into each one or more agitators. One convenient construction of the agitators is illustrated in the drawings. Upon vertical guide bars $f$ is slidably mounted a cross head $g$ from which are suspended spindles $m$, as shown, carrying beaters or paddles $h$. The latter rotate in unison, being geared together by spur wheels $i$ driven from an electric motor $j$ through suitable gearing. I do not however limit myself to any particular means for driving the paddles or beaters. When the beaters are in operation, the currents induced in the molten salt will intercept and break up one another and so cause the impurities to fall to the bottom of the converter. During the agitating process the converters may be kept at a high temperature so as to aid the residual matter to separate out from the salt, and lime and niter in quantities of about 0.1 to 1 per cent. may be added to the molten material to oxidize any oxidizable impurities.

After the treatment above described which generally will be found to have completed purification in from 10 to 15 minutes the cross head $g$ is lifted by means of the chain $k$, the paddles or beaters $h$, being thus raised out of the converter. The detachable liner $b$ is then removed from the converter and carries with it any discolored salt which may have congealed thereon. The greater part of the sediment contained in the molten material will now be found to have settled at the bottom of the converter. The converters are now drawn slowly along the track, and by such motion a gentle agitation is given to the molten salt; or, if desired, the rails of the track may be indented as shown in Fig. 2, or other means may be adopted for setting up a gentle agitating or vibratory movement which greatly assists in the deposition of the residual matter or impurities. After the salt has been sufficiently cooled, it is removed as a block from the converter and the impure lower portion of the block can be readily knocked off.

I may if desired arrange the agitators $h$ to be rotated in one direction for a short time and then in a reverse direction, and also if desired to be automatically raised and lowered in the molten salt by means of the chain $k$ while they are rotating. They may also be used in the melting furnace, but this will not as a rule be found necessary or desirable.

I may use any number and arrangement of paddles or beaters in one converter. For example, in very large converters, I may employ four sets of such paddles or beaters and arrange their supporting spindles to be driven from a spur wheel arranged in the center at their upper ends. The paddles may be made of any suitable size and shape. As a modification, the paddles $h$ may be pivotally attached to their supporting bars or spindles 15, 15 so that they can move into a horizontal position by centrifugal force when they are rotated, and, when at rest, hang in a vertical position.

By the use of my process, I dispense with hot air stoves, blowing engines and the like which have previously been used for purifying molten salt, and obtain a more efficient, durable and reliable apparatus than has heretofore been possible, as the excessively high temperatures which have been found necessary with the before mentioned process have caused great wear and tear on the parts of the apparatus.

Having now described my invention, what I claim as new and desire to secure by Letters Patent is:—

1. The process of purifying rock salt, consisting in melting the said salt and subjecting the molten mass to the action of agitators rotated therein whereby the salt and its impurities are separated, substantially as described.

2. The process of purifying rock salt, consisting in melting the said salt, drawing the molten material into a converter, adding an oxidizing material to the molten mass, and subjecting the said mass to a mechanical agitation whereby the said salt and its impurities are separated, substantially as described.

3. The process of purifying rock salt, consisting in melting the said salt, drawing the molten material into a converter, subjecting the molten mass to the action of agitators rotated therein, whereby the salt and its impurities are separated, and imparting a vibratory movement to the converter and the agitated mass whereby the deposition of the impurities is facilitated, substantially as described.

In testimony whereof, I affix my signature in presence of two witnesses.

BALFOUR FRASER McTEAR.

Witnesses:
WILLIAM JOSEPH WOODCOCK,
VIVIAN ARTHUR HUGHES.